United States Patent
Firooz et al.

(10) Patent No.: US 10,552,762 B2
(45) Date of Patent: Feb. 4, 2020

(54) MACHINE LEARNING OF PHYSICAL CONDITIONS BASED ON ABSTRACT RELATIONS AND SPARSE LABELS

(71) Applicant: Falkonry Inc., Santa Clara, CA (US)

(72) Inventors: Mohammad H. Firooz, San Jose, CA (US); Nikunj R. Mehta, Cupertino, CA (US); Greg Olsen, Menlo Park, CA (US); Peter Nicholas Pritchard, Mountain View, CA (US)

(73) Assignee: Falkonry Inc., Sunnyvale, CA (US)

( * ) Notice: Subject to any disclaimer, the term of this patent is extended or adjusted under 35 U.S.C. 154(b) by 888 days.

(21) Appl. No.: 15/195,873

(22) Filed: Jun. 28, 2016

(65) Prior Publication Data

US 2017/0017901 A1    Jan. 19, 2017

Related U.S. Application Data

(60) Provisional application No. 62/193,449, filed on Jul. 16, 2015.

(51) Int. Cl.
*G06N 20/00* (2019.01)
*G05B 13/02* (2006.01)
(Continued)

(52) U.S. Cl.
CPC ......... *G06N 20/00* (2019.01); *G05B 13/0265* (2013.01); *G05B 23/0283* (2013.01);
(Continued)

(58) Field of Classification Search
CPC .............. G05B 23/024; G05B 23/0272; G05B 23/0275; G05B 23/0283; G05B 23/0286;
(Continued)

(56) References Cited

U.S. PATENT DOCUMENTS

2002/0152056 A1    10/2002   Herzog et al.
2006/0036403 A1    2/2006    Wegerich et al.
(Continued)

OTHER PUBLICATIONS

International Searching Authority, "Search Report" in application No. PCT/US16/42465, dated Sep. 29, 2016, 16 pages.
(Continued)

*Primary Examiner* — Shane D Woolwine
(74) *Attorney, Agent, or Firm* — Hickman Palermo Becker Bingham LLP

(57) ABSTRACT

A method for determining specific conditions occurring on industrial equipment based upon received signal data from sensors attached to the industrial equipment is provided. Using a server computer system, signal data is received and aggregated into feature vectors. Feature vectors represent a set of signal data over a particular range of time. The feature vectors are clustered into subsets of feature vectors based upon attributes the feature vectors. One or more sample episodes are received, where a sample episode includes sample feature vectors and specific classification labels assigned to the sample feature vectors. A signal data model is created that includes the associated feature vectors, clusters, and assigned classification labels. The signal data model is used to assign classification labels to newly received signal data using the mapping information for the existing feature vectors, existing clusters and associated classification labels to determine the specific conditions occurring on the industrial equipment.

24 Claims, 7 Drawing Sheets

(51) Int. Cl.
*G06N 5/00* (2006.01)
*G06N 20/10* (2019.01)
*G05B 23/02* (2006.01)
*G06N 20/20* (2019.01)
*G06F 3/0484* (2013.01)

(52) U.S. Cl.
CPC ............. *G06N 5/003* (2013.01); *G06N 20/10* (2019.01); *G05B 13/026* (2013.01); *G05B 13/0255* (2013.01); *G05B 23/0275* (2013.01); *G06F 3/0484* (2013.01); *G06N 20/20* (2019.01)

(58) Field of Classification Search
CPC ............. G05B 23/0289; G05B 23/0291; G05B 23/0297; G05B 13/0255; G05B 13/026; G05B 13/0265; G06N 20/00; G06N 20/10; G06N 20/20; G06N 5/003; G06N 5/047; G06F 3/0484

USPC .................................. 706/112, 12; 715/736
See application file for complete search history.

(56) References Cited

U.S. PATENT DOCUMENTS

| | | |
|---|---|---|
| 2009/0043405 A1 | 2/2009 | Chester et al. |
| 2013/0024415 A1 | 1/2013 | Herzog |
| 2013/0332773 A1 | 12/2013 | Yuan et al. |
| 2015/0095247 A1* | 4/2015 | Duan ................. G06Q 30/0185 705/318 |
| 2016/0352759 A1* | 12/2016 | Zhai ..................... H04L 63/1416 |
| 2017/0092021 A1* | 3/2017 | Nielsen ................ G05B 23/024 |

OTHER PUBLICATIONS

Current Claims in application No. PCT/US 16/42465, dated Sep. 2016, 7 pages.

* cited by examiner

MACHINE LEARNING OF PHYSICAL CONDITIONS BASED ON ABSTRACT RELATIONS AND SPARSE LABELS

BENEFIT CLAIM

This application claims the benefit of provisional application 62/193,449, filed Jul. 16, 2015, the entire contents of which is hereby incorporated by reference as if fully set forth herein, under 35 U.S.C. § 119(e).

FIELD OF THE DISCLOSURE

The disclosure generally relates to computer-implemented monitoring and maintenance systems for apparatus such as industrial machines. The disclosure relates more specifically to classifying signal data received from machines to identify specific machine conditions that might indicate a need for maintenance, repair or other management actions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Power plants, wastewater treatment plants, factories, airplanes, and automobiles are some examples of complex systems that include multiple machines operating to accomplish objectives. Understanding and identifying operating conditions of complex systems from data streams produced by those systems allow operators of those systems to monitor and ensure efficient operation of those systems. The ability to identify certain operating conditions allows operators to adjust those systems to avoid unnecessary failure. Identifying impending failure or other conditions typically is done by studying the output values from sensors of various types that are mounted on the machines or systems and produce displays, indicators, or output data streams.

One such technique for monitoring data streams that are produced by complex systems is condition recognition based upon machine learning techniques executed using computers. Implementing machine learning based on condition recognition generally requires a large data set of input values from the data stream and a pre-existing well-formed training data set from which a condition model may be constructed. Given the complexity of typical industrial systems, machine learning algorithms cannot produce good results unless they receive a training data set that is sufficiently large and well correlated with particular conditions. However, even a well-formed training data set that defines the conditions may not consistently predict conditions of the data stream if the environment of the complex system changes or if parts of the complex system change or wear out over time.

Continually evolving conditions and the inability to account for all conditions within a well-formed training data set make implementing machine learning techniques for condition recognition difficult.

DETAILED DESCRIPTION

Figure 1:
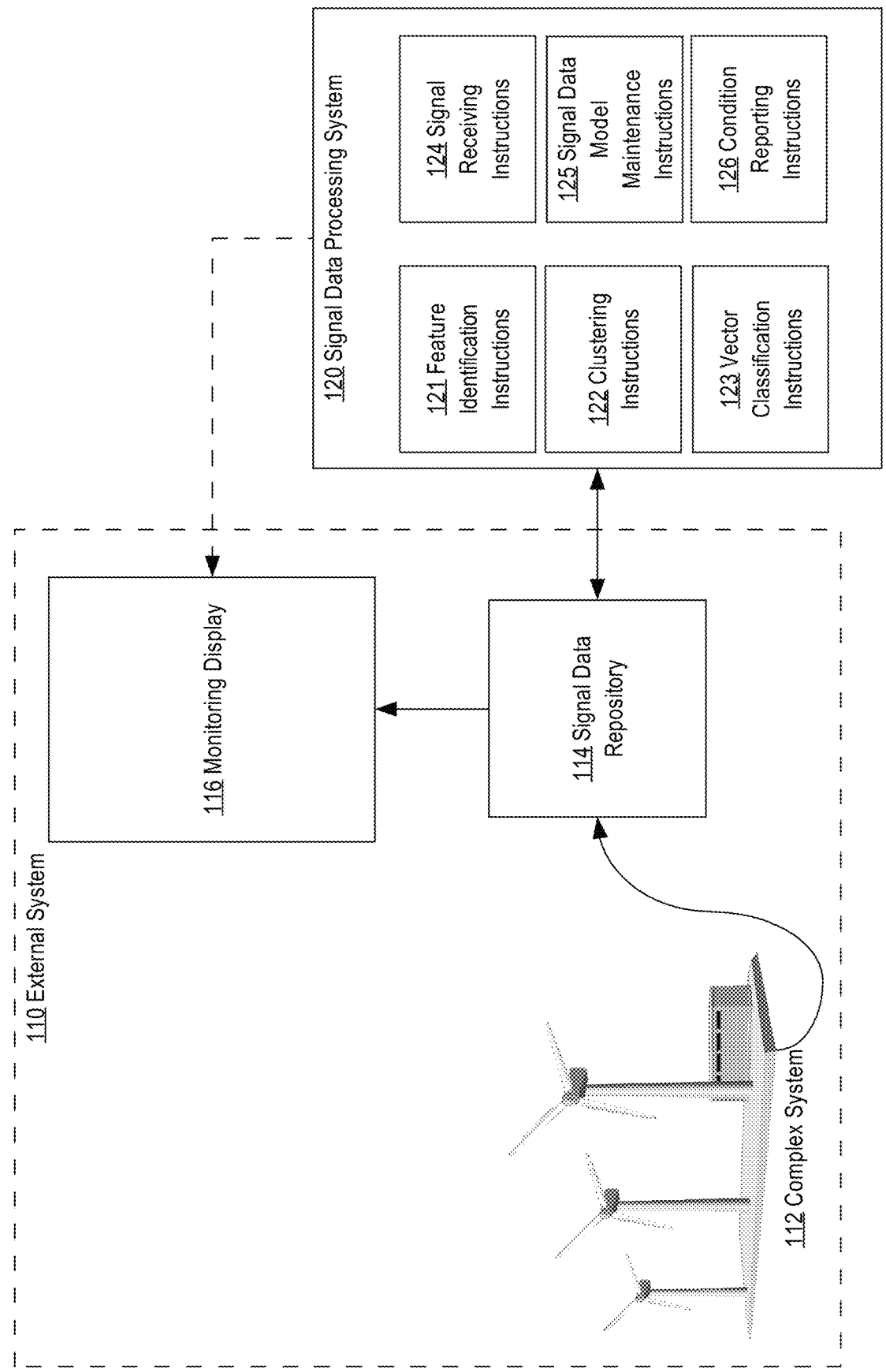
FIG. 1 is a block diagram that depicts an arrangement for implementing a signal data processing system that receives a data stream of signal data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview
    2.0 Structural Overview
    3.0 Functional Overview
      3.1 Building Signal Data Model
        3.1.1 Signal Receiving Instructions
        3.1.2 Feature Identification Instructions
        3.1.3 Clustering Instructions
        3.1.4 Vector Classification Instructions
        3.1.5 Using Historical Mapping Information
      3.2 Assessing Data Stream Using Signal Data Model
        3.2.1 Condition Determination Instructions
        3.2.2 Condition Reporting Instructions
        3.2.3 Modifying Machines Based Upon Reported Conditions
    4.0 Hardware Overview
    1.0 General Overview A computer system and computer-implemented method are provided, and are configured determine specific conditions occurring on industrial equipment based upon received signal data from sensors. In an embodiment, determining specific conditions occurring on industrial equipment may be accomplished using a server computer system that receives signal data that represents observed data values from one or more sensors attached to industrial equipment. Within the server computer system signal receiving instructions receive one or more sets of signal data. Feature identification instructions, within the server computer system, aggregate the one or more sets of signal data into feature vectors. Feature vectors represent a set of signal data over a particular range of time. Clustering instructions, within the server computer system, determine one or more clusters for the one or more feature vectors. The one or more clusters are made up of a subset of feature vectors from the one or more feature vectors and are based upon attributes within the subset of feature vectors. Vector classification instructions, within the server computer, receive one or more sample episodes from a user or other external source. The one or more sample episodes include sample feature vectors that have been assigned a specific classification label. The classification labels represent particular identified conditions that have occurred on the industrial equipment. The vector classification instructions then determine a classification label for the one or more clusters based upon the one or more sample episodes received. The vector classification instructions generate and store a signal data model that defines identified signal conditions that represent conditions occurring on the industrial equipment. The identified signal conditions define mapping between specific feature vectors, specific clusters, and specific classification labels.

In an embodiment, the generated signal data model may be used to assess new signal data sets received by the server computer system. Signal data model maintenance instructions maintain one or more previously generated signal data models, including mapping data between existing feature vectors, existing clusters, and classification labels. The signal receiving instructions receive one or more sets of new signal data from the one or more sensors attached to the industrial equipment. The feature identification instructions aggregate the one or more sets of new signal data into one or more feature vectors. The vector classification instructions then assign one or more existing classification labels and one or more existing clusters to the one or more feature vectors using a previously generated signal data model. The condition reporting instructions send the one or more feature vectors and the one or more classification labels assigned to the one or more feature vectors to a user.

The one or more feature vectors and the one or more classification labels may then be used to update existing condition states within the industrial equipment thereby improving condition state recognition, within the industrial equipment, and improving the safety, reliability, and quality of the running condition states of the industrial equipment. The one or more feature vectors and the one or more classification labels may also be used to recognize specific unwanted conditions, within the industrial equipment, for the purpose of reducing inefficiency and unsafe behaviors of the industrial equipment.

2.0 Structural Overview

FIG. 1 is a block diagram that depicts an arrangement for implementing a signal data processing system that receives a data stream of signal data from a complex system, such as an industrial machine, and implements machine learning techniques to identify and label physical conditions occurring on the complex system based upon the data stream. In an embodiment, signal data processing system 120 is a system configured to receive the data stream from external system 110. External system 110 may represent any external system that is used to run and monitor an industrial machine. Another embodiment of external system 110 may include computer systems programmed to monitor activity and real-time conditions of the human body. Yet other embodiments of the external system 110 include computer systems programmed to monitor the activity and state of various software programs.

FIG. 1 depicts a sample arrangement of the external system 110, which includes a complex system 112, a signal data repository 114, and a monitoring display 116. In an embodiment, the complex system 112 may represent a complex industrial machine such as complex factory equipment, commercial vehicles, aircrafts, or any other complex machinery that utilizes multiple sensors to monitor the state of the machinery. In an embodiment, the complex system 112 may also represent a complex sensor package that includes multiple types of sensors designed to function as an activity tracker, such as wireless-enabled wearable technology devices.

In an embodiment, the complex system 112 may be communicatively coupled to the signal data repository 114 for the purposes to sending a data stream of signal data from multiple sensors attached to the complex system 112. The data stream of signal data may represent multiple data observations collected by the multiple sensors. The purpose of the multiple sensors on the complex system 112 is to record observations occurring at various points within the complex system 112. For example, if the complex system 112 is at power plant made up of multiple windmills that generate energy from the wind, then the multiple sensors may include: sensors that measure the rotational speed of each individual windmill, sensors that measure the electrical charge generated by each windmill, and sensors that measure the current storage levels of electricity generated by the electrical generators within the power plant. In another example, the complex system 112 may represent a wireless activity tracker. In this case, the multiple sensors may be configured to detect changes occurring to the wearer and positional changes based on movement. For instance, the set of sensors may include, but are not limited to, a global positioning sensor (GPS), a 3-axis accelerometer, a 3-axis gyroscope, a digital compass, an optical heart rate monitor, and an altimeter. In yet another example, the complex system 112 may represent a particular application, such as a commercial application. The particular application may include one or more computer classes that generate output, such as log output, for the particular computer application. The log output generating classes may be considered built-in instrumentation that reports the current state of multiple classes and objects invoked within the particular computer application.

In an embodiment, the signal data repository 114 may represent a server computer that is configured or programmed to collect signal data produced by the multiple sensors on the complex system 112, store the signal data based on the signal data type, and create a time series for the collected signal data, using one or more stored program that the server computer executes. The signal data repository 114 may also be capable of sending either real-time data or stored signal data to the monitoring display 112 for the purposes of presenting signal data values to a user for monitoring purposes. The signal data repository 114 may also aggregate the signal data to create aggregated statistics showing changes in signal values over periods of time. Embodiments of the signal data repository 114 features are not limited to the features described above. The signal data repository 114 may be implemented using any commercially available monitoring programs and may utilize any monitoring features within the commercially available products.

In an embodiment, the monitoring display 116 represents a computer-implemented machine programmed to display the signal data received from the signal data repository 114. In an embodiment, the monitoring display 116 may be capable of directly receiving data input from signal data processing system 120.

In an embodiment, signal data processing system 120 is configured to receive a data stream of signal data from the signal data repository 112 and identify physical conditions related to the signal data received. The signal data processing system 120 is further configured to send the identified physical conditions to the external system 110, either by sending data back to the signal data repository 112 or by sending data directly to the monitoring display 116 so that a user can better identify conditions related to the incoming signal data.

In an embodiment, the signal data processing system 120 contains specially configured logic including, but not limited to, feature identification instructions 121, clustering instructions 122, vector classification instructions 123, signal receiving instructions 124, signal data model maintenance instructions 125, and condition reporting instructions 126. Each of the foregoing elements is further described in structure and function in other sections herein. Each of the elements comprise executable instructions loaded into a set of one or more pages of main memory, such as RAM, in the signal data processing system 120 which when executed cause the signal data processing system 120 to perform the functions or operations that are described herein with reference to those modules. For example, the feature identification instructions 121 may comprise executable instructions loaded into a set of pages in RAM that contain instructions which when executed cause performing the feature identification functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the feature identification instructions 121, the clustering instructions 122, the vector classification instructions 123, the signal receiving instructions 124, the signal data model maintenance instructions 125, and the condition reporting instructions 126 also may represent one or more files or projects of source code that are digitally stored in a mass storage device such as non-volatile RAM or disk storage, in the signal data processing system 120 or a separate repository system, which when compiled or interpreted cause generating executable instructions which when executed cause the signal data processing system 120 to perform the functions or operations that are described herein with reference to those modules. In other words, the drawing figure may represent the manner in which programmers or software developers organize and arrange source code for later compilation into an executable, or interpretation into bytecode or the equivalent, for execution by the signal data processing system 120.

The signal receiving instructions 124 provide instructions to receive multiple sets of signal data representing observed data values from multiple sensors attached to the complex system 112. The feature identification instructions 121 provide instructions to aggregate the multiple sets of signal data into one or more feature vectors. Feature vectors represent sets of signal data from one or more sensors for a particular range of time. The clustering instructions 122 provide instructions to generate one or more clusters of feature vectors, in which each cluster is determined by similarly identified attributes from feature vectors. The vector classification instructions 123 provide instructions to receive feedback input that describes one or more classification labels that may be assigned to feature vectors based upon previously observed sensor data. The feedback may be characterized as a sample episode. A sample episode includes signal data in the form of a sample feature vector and an assigned classification label for the sample feature vector. The classification label may describe a particularly identified condition that occurred to the complex machine 112. The vector classification instructions 123 provide further instructions to determine classification labels for the generated clusters of feature vectors. Upon determining classification labels for the generated clusters of feature vectors, the vector classification instructions 123 provide instructions to generate and store, within a storage medium, a signal data model that defines identified signal conditions based upon the associated cluster, feature vectors, and classification label. The vector classification instructions 123 provide further instructions to update a previously generated signal data model using the identified signal conditions based upon the associated clusters, feature vectors, and classification labels. The signal data model maintenance instructions 125 provide instructions to maintain one or more signal data models within digital storage media. The condition reporting instructions 126 provide instructions to send identified classification labels that are associated to the one or more feature vectors to the external system 110.

3.0 Functional Overview 3.1 Signal Data Model

Figure 2:
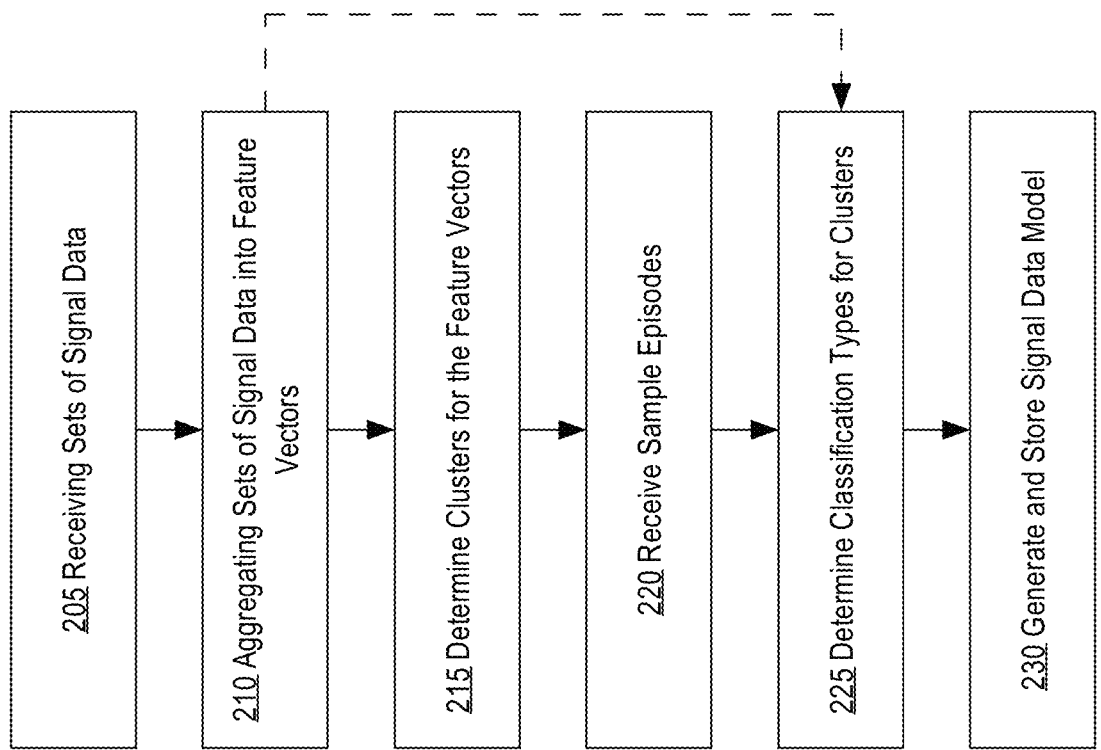
FIG. 2 is a flow diagram that depicts a process for generating a signal data model based upon a received data stream of signal data.

FIG. 2 is a flow diagram that depicts a process for generating a signal data model based upon signal data from the signal data repository 114 and sample episodes that define classification labels and feature vectors associated with the classification labels. FIG. 2 may be implemented, in one embodiment, by programming the elements of the signal data processing system 120 to perform functions that are described in this section, which may represent disclosure of an algorithm for computer implementation of the functions that are described. For purposes of illustrating a clear example, FIG. 2 is described in connection with certain elements of FIG. 1. However, other embodiments of FIG. 2 may be practiced in many other contexts and references herein to units of FIG. 1 are merely examples that are not intended to limit the broader scope of FIG. 2.

3.1.1 Signal Receiving Instructions

At step 205, signal data from the signal data repository 114 is received by the by the signal data processing system 120. Signal data may be defined as a digital stream of signals that depict different measured values from multiple sensors on the complex system 112. In an embodiment, the signal data may be received in the form of digital data sets that make up multiple measured values from multiple sensors for a given moment in time. For example, if the complex system 112 is an activity tracking device, a signal data set for the activity tracking device may include, but is not limited to, a set of data values that measure acceleration, velocity, altitude, and orientation for the x, y, and z-axes at a given moment in time.

In an embodiment, the signal receiving instructions 124 provide instruction to receive the signal data from the signal data repository 114. The signal receiving instructions 124 may provide instructions to receive signal data as the signal data is being created, in other words in real-time. In this scenario, the signal receiving instructions 124 may provide instructions to buffer the received signal data until there is a sufficient amount of signal data covering a long enough period of time to perform feature identification. For instance, if the signal data only covers a short period of time, then features within the signal data may not be discoverable because the signal data does not include sufficient changes in data values to uncover meaningful patterns.

In another embodiment, the signal receiving instructions 124 may provide instructions to receive signal data that covers a range in time in the past that is long enough to discover sufficient changes in data values and meaningful patterns in the signal data. For example, the signal data processing system 120 may receive, from the signal data repository 114, signal data sets that refer to signal data values from the previous 24-hour period. In this scenario, the signal data sets cover a sufficient range of time such that signal data buffering is not required. The signal receiving instructions 124 may provide instruction for configurable buffering based upon a minimum time range of the signal data received. Buffering requirements may be based on the type of signal data and the duration of data value changes within the signal data sets.

In an embodiment, the signal receiving instructions 124 may provide instruction to pre-process the signal data sets in order to filter out signals that may cause noise or other effects that obfuscate potential pattern recognition in signal data. The signal receiving instructions 124 may provide instruction to transform and filter out unwanted signal values that are not relevant to the received signal data. For example, if the external system 110 is an industrial machine equipped with audio sensors configured to detect soundwaves emitted from various points on the external machine 110, then the signal receiving instructions 124 may include instructions to filter out specific soundwave signatures that are known to be background noise that do not affect the state of the external system 110. Additionally, the signal receiving instructions 124 may include instruction to transform the received soundwave signals into a fixed-length vector representing a defined time window. For instance the received soundwave signals may be transformed into a 10 Hz signal that contains the transformed fixed-length vector for a 100 millisecond time window.

3.1.2 Feature Identification Instructions

At step 210, the signal data processing system 120 aggregates the signal data sets into one or more feature vectors. In an embodiment, the feature identification instructions 121 provide instruction to identify patterns from multiple signal data sets. Patterns are based upon variations across different signals and over a specific period of time. For instance a condition of a particular piece of equipment within the complex system 112 at a specific time t may depend on different sets of signal values from one or more sensors over a period of time leading up to time t. The condition may be represented by a set of signal data from time (t–x) to time t, where x is a specific duration of time such that (t–x) is a period in time that occurs before time t.

In an embodiment, feature identification instructions 121 may provide instruction to determine the optimal time window size for evaluating multiple sets of signal data in order to identify meaningful patterns. The feature identification instructions 121 may provide instruction to implement a sliding window by step size approach for feature detection within signal data over a period of time. The sliding window by step size approach involves determining a size of a time duration window for analyzing signal data and step size for advancing the time duration window in order to discover patterns of statistical interest based upon the time duration window. In an embodiment, the feature identification instructions 121 may provide instruction to evaluate the signal data sets by using auto-correlation to find a time duration window and step size that provides signal data of statistical interest. Auto-correlation in this context refers to analyzing the signal data set in order to discover repeating patterns that may be used to define the size of the time duration window and step size.

In an embodiment, the feature identification instructions 121 provide instruction to reduce the set of signal data points within the time duration window to generate a feature vector of reduced dimensionality. The feature vectors generated represent an aggregated set of signal data sets over the time duration window. Additionally, the dimensionality of the feature vectors may be reduced further in order to eliminate dependencies. In an embodiment, the feature identification instructions 121 provide instruction to implement principle component analysis to reduce the dimensionality of the set of feature vectors to a single feature vector that corresponds to the full set of signals for each step in time.

In an alternative embodiment, the feature identification instructions 121 provide instruction to aggregated signal data sets to generate feature vectors using a recurrent neural network. For example, long short-term memory is a recurrent neural network architecture that contains long short-term memory blocks. A long short-term memory block may be described as a "smart" network unit that can remember a value for an arbitrary length to time. The long short-term memory blocks contains gates that determine when an input is significant enough to remember, when it should continue to remember or forget the value, and when it should output the value. In this context the long short-term memory network may transform the signal data set into a single sequence of feature vectors that captures time sequence patterns of the signal data as a whole.

In an embodiment, the feature identification instructions 121 provide instruction to create mapping between the signal data sets and their corresponding feature vectors. In an embodiment, if a previously generated signal data model already exists based upon historical signal data that is from the same multiple sensors and complex system 112 as the signal data sets received by the signal receiving instructions 124, then the previously generated signal data model may be used to determine classification labels for the newly identified feature vectors. In this scenario, the signal data processing system 120 may directly proceed to step 225 to determine classification labels for the newly identified feature vectors.

In an embodiment, a previously generated signal data model may be used to create a new signal data model based upon newly identified feature vectors and the previously generated signal data model. Alternatively, the previously generated signal data model may be automatically augmented using the newly identified feature vectors. Automatic augmentation of the previously generated signal data model may include fine-tuning of parameters used to determine classification labels. For example, automatic augmentation of the previously generated signal data model may be included as a step for updating classification parameters, where in some instances parameter updates may include either very small or more significant changes to the classification parameters. Details for generating a new signal data model using a previously generated signal data model or augmenting a previously generated signal data model are described in detail in the USING HISTORICAL MAPPING INFORMATION section herein.

3.1.3 Clustering Instructions

Referring back to FIG. 2, at step 215 the signal data processing system 120 determines and generates one or more clusters to associate feature vectors generated in step 210. In an embodiment, the clustering instructions 122 provide instruction to generate an optimal number of clusters from the feature vectors. Determining the number of clusters to generate is based upon analyzing the feature vectors and identifying mathematically significant regions in the vector feature space. In an embodiment, identifying mathematically significant regions does not dependent on the time sequence associated with each vector.

In an embodiment, feature vectors are grouped together to generate clusters using an adaptive k-mean algorithm to identify an optimal number of clusters within the set of vectors and to associate each vector with a cluster. If a feature vector does not contains any mathematically significant regions then that feature vector may be designated as an outlier and will not be associated with any of the generated clusters. In an embodiment, mapping information between feature vectors and their associated clusters may be generated.

3.1.4 Vector Classification Instructions

At step 220, the signal data processing system 120 may receive sample episodes from a user in the form of user input or user feedback. Sample episodes may be defined as classification label-to-feature vector mappings that are based on either user-defined signal data or historical signal data from previous signal data models. In an embodiment, vector classification instructions 123 provide instruction to receive the sample episodes. The received sample episodes may be particularly helpful to classify the feature vectors. Clusters of feature vectors that are not able to be classified based on the received sample episodes, may then be given an arbitrary label that may be modified or defined through direct feedback from a user or from future clustering and classification by the signal data processing system 120.

At step 225, the signal data processing system 120 assigns a classification label to the generated clusters using sample episodes to determine which clusters map to which classification label. In an embodiment, the vector classification instructions 123 provide instruction to classify one or more of the generated clusters based upon existing classification label-to-feature vector mapping from sample episodes. Sample episodes may contain time periods at which a verified condition occurs. That condition may then be defined with a particular classification label.

For example, signal data received may correspond to multiple sensors placed on human subjects for the purpose of tracking specific types of activity. In this example sample episodes may refer to known periods of verified activity such as, sitting, walking, cycling, rowing, and jumping. The sample episodes may also contain a particular time range for the verified activity. For instance time t=20 to t=40 may be associated with the verified activity of jumping. If a particular cluster of feature vectors refer to the same points in time, t=(20–40), then that cluster and feature vectors may be assigned the classification label for the verified activity of jumping.

Generated clusters may contain feature vectors that include sensor data that does not entirely map to the sample episodes provided. In an embodiment, the signal data processing system 120 may implement multivariate regression techniques to classify the remaining generated clusters and feature vectors. For example, the signal data processing system 120 may implement logistic regression approach to map the feature vectors to conditions inferred by the logistic regression approach. In another embodiment, the signal data processing system 120 may generate inferred conditions using learning methods such as random forest to generate inferred conditions. Random forest is an ensemble learning method for regression analysis that operates by constructing multiple decision trees during a training period and then outputs the class that is the mean regression of the individual trees.

At step 230, the signal data processing system 120 generates and stores a signal data model in digital storage. In an embodiment, the vector classification instructions provide instruction to generate and store a signal data model. The generated signal data model contains mapping information between feature vectors, associated clusters, and assigned classification labels used to identify a particular condition for the particular feature vector. For example, the signal data model may contain mapping information for a set of vectors that are associated with "cluster A" that have been assigned a classification label of "jumping". This classification label means that the set of feature vectors that are part of cluster A and indicate a condition describing when a human subject is jumping.

In an embodiment, the mapping information may not contain an associated classification label. For example, sets of feature vectors belonging to "cluster B" that are not assigned a particular classification label may be given an unassigned label with a unique identifier such as "unassigned 1" or "unassigned 2". These unassigned labels may be based upon inferred conditions discovered at step 225 using multivariate regression techniques. Mapping for these sets of feature vectors may be represented as: "feature vectors X", "cluster B", and "unassigned 1".

The generated signal data model may then be used by the signal data processing system 120 to assign classifications to new signal data received during another session.

3.1.5 Using Historical Mapping Information

Figure 4:
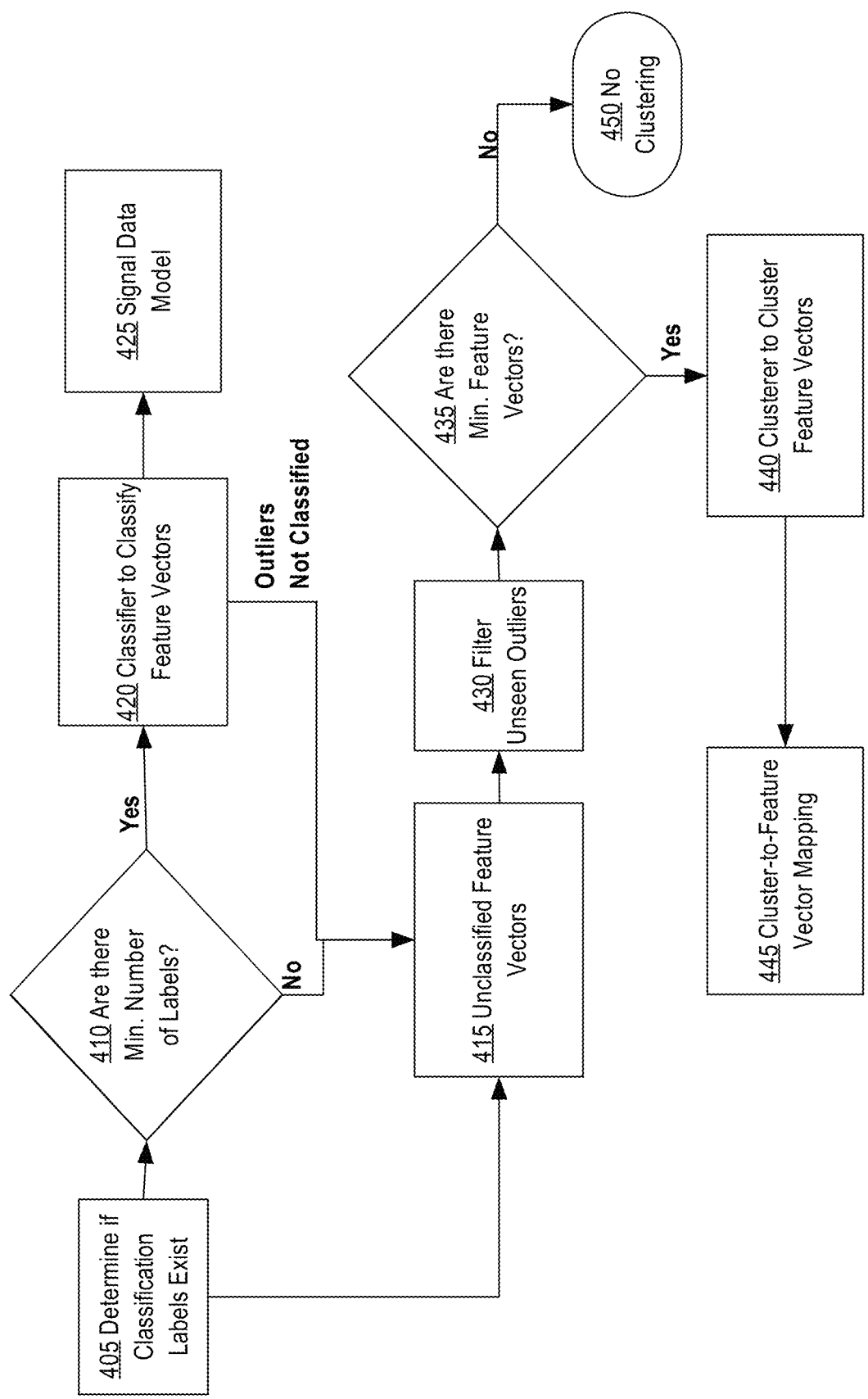
FIG. 4 depicts an example of using mapped feature vectors-to-classification labels in a previously generated signal data model to classify a new set of feature vectors.

As described previously, historical signal data from an existing signal data model may be used to at least partially classify a new set of feature vectors. FIG. 4 depicts an example of using mapped feature vectors to classification labels in a previously generated signal data model to classify a new set of feature vectors. In an embodiment, block 405 depicts determining if the current iteration of building a signal data model has historical classification labels available from the previously generated signal data models. If historical classification labels exist then the signal data processing system 120 proceeds to decision diamond 410 to determine whether there are a minimum number of classification labels available. If however, there are no historical classification labels available then the signal data processing system 120 proceeds to block 415, which block represents a set of unclassified feature vectors waiting to be clustered.

Referring back to decision diamond 410, if there are available historical classification labels, then the signal data processing system 120 determines whether there is the requisite minimum number of classification labels available. If there are not enough classification labels to classify the feature vectors then the signal data processing system 120 proceeds to block 415 that represent a set of unclassified feature vectors waiting to be clustered instead of using the classification labels to classify the feature vectors. Attempting to classify feature vectors with an insufficient number of classification labels may result in either too many unclassified feature vectors or feature vectors being misclassified because there is a lack of diversity within the classification labels. If however, there are a sufficient number of classification labels at decision diamond 410, then the signal data processing system 120 would proceed to block 420 to classify the feature vectors. In an embodiment, the signal data processing system 120 may use a configured minimum number of classification labels with which to determine whether to proceed to block 420. The configured minimum number of classification labels may be based on the size of the feature vector pool, the number of sensors, and the different types of signal data received.

At block 420 the signal data processing system 120 implements vector classification instructions to classify the feature vectors. In an embodiment, when a feature vector is classified to a classification label a mapping is created between the feature vector and the classification label. In an embodiment, the mapping may be further augmented by cluster information, which may be based on attributes in the feature vectors and/or classification labels. The clustering information (not presently depicted within this step) may be implemented using the clustering instructions 122. In an embodiment at block 425, signal data processing system 120 creates a signal data model based on the mapping information from block 420.

In an alternative embodiment, signal data processing system 120 automatically augments the current signal data model that supplied the classification labels with mapping information from block 420. The mapping information may include specific information related to the newly identified feature vectors, their clustering information, and the existing classification labels. The benefit to automatically augmenting the existing classification labels with the mapping information is that it allows the current signal data model to continually learn from classification decisions, thereby self-tuning its classification decisions based upon each mapping of feature vectors. In an embodiment, automatic augmentation may include slight changes or more significant changes to the classification parameters based upon the variances between new new feature vectors and their mapping information and existing mapping information stored in the current signal data model.

In an embodiment, if feature vectors are not successfully assigned to a historical classification label, then the remaining feature vectors may represent outliers and may be sent to block 415 to be clustered with any other unclassified feature vectors. Outliers, in this context, refer to feature vectors that do not map to any classification labels.

Block 415 represents a collection of feature vectors that either could not be classified due to the insufficient number of historical classification labels or features vectors that do not match the historical classification labels. At block 430, the signal data processing system 120 filters out possible feature vector outliers that do not represent any meaningful data. Feature vectors may be based on signal data that represents false conditions based upon known signatures signal values or frequencies that cause the false conditions. For example, a conveyor belt sensor may report high levels of heat at certain times of the day but, those measured high levels of heat may be related to known environmental conditions and should be ignored. In an embodiment, outliers recognized as known ignorable conditions are filtered out of the set of feature vectors. The remaining feature vectors not filtered out at block 430 are then sent to decision diamond 435.

In an embodiment, decision diamond 435 determines whether there are a sufficient number of feature vectors to perform clustering. If there are not a sufficient number of feature vectors then the signal data processing system 120 does not attempt clustering (block 450 represents no clustering). Clustering when there are not a sufficient number of feature vectors may lead to unnecessarily skewed cluster sets and errors during the classification process. Therefore the signal data processing system 120 determines whether the configured minimum number of feature vectors is met. In an embodiment, the minimum number of feature vectors for clustering may be based on the type of data and number of data points within the feature vectors.

If the minimum configured number of feature vectors is met, then the signal data processing system 120 proceeds to step 440 to perform clustering. At step 440 the signal data processing system 120 implements clustering instructions to cluster the remaining feature vectors based on analyzing the set feature vectors and identifying mathematically significant regions in the vector feature space. The resulting number of clusters and their associated feature vectors are represented in block 445. In an embodiment, block 445 represents the signal data processing system 120 creating feature vector-to-cluster mapping.

Referring back to steps 220, 225, and 230 of FIG. 2, the signal data processing system 120 then receives sample episodes that include defined classification labels and sample feature vectors that are used to assign classification labels to the remaining feature vectors and their clusters. In an embodiment, at step 230 the signal data processing system may generate mapping information between feature vectors, associated clusters, and assigned classification labels used to identify the particular condition for the particular feature vector and store the mapping information into a signal data model. In an embodiment, signal data processing system 120 creates a new signal data model based on the mapping information and any historical classification labels used to assign classifications for feature vectors at step 420. In an alternative embodiment, signal data processing system 120 augments the previously generated signal data model that supplied the classification labels for block 420 with the newly classified feature vectors and clusters mapped at block 445.

3.2 Assessing Data Stream Using Signal Data Model

Figure 3:
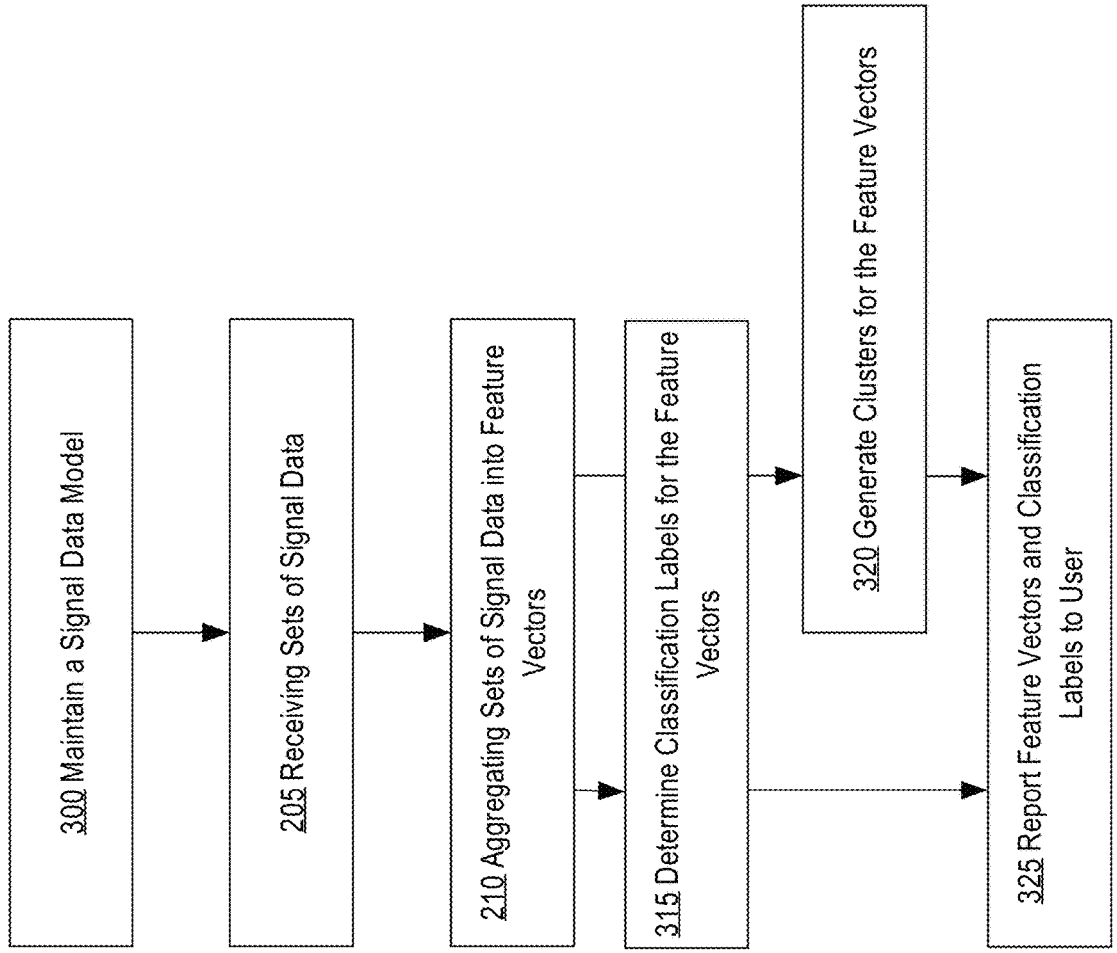
FIG. 3 is a flow diagram that depicts assessing and classifying signal data received using an existing signal data model.

Referring back to step 230 of FIG. 2, the generated signal data model may be used to assess new signal data and assign known classification labels to feature vectors generated from the new signal data. Additionally, the generated signal data model may be augmented with the new signal data to further refine classification labels and their associated feature vectors and clusters. FIG. 3 represents a sample embodiment of assessing and classifying signal data received using an existing signal data model.

At step 300, the signal data processing system 120 maintains one or more existing signal data models. In an embodiment, the signal data model maintenance instructions 125 provide instruction to maintain the one or more existing signal data models. The signal data models may represent electronically stored models that were created using historical signal data.

Steps for receiving sets of new signal data and aggregating the sets of new signal data into a set of feature vectors are substantially similar to the receiving and aggregating steps 205 and 210 from FIG. 2. Therefore FIG. 3 shows step 205, receiving signal data sets, and step 210, aggregating signal data sets into feature vectors.

3.2.1 Condition Determination Instructions

At step 315, the signal data processing system 120 assigns defined conditions from the existing signal data model to the set of feature vectors. In an embodiment the vector classification instructions 123 provide instruction to assign conditions to the set of feature vectors using known classification mapping from the existing signal data model. In an embodiment, the signal data processing system 120 may be configured to use a specific existing signal data model for classification, in which the user chooses the specific existing signal data model. In another embodiment, the signal data processing system 120 may be configured to automatically choose an existing signal data model based upon either, the type of signal data received and which complex system 112 the signal data originated from, the creation date of a specific existing signal data model, and/or based upon the number of classification labels stored within a specific existing signal data model. In an embodiment of step 315, the signal data processing system 120 may be configured to receive sample episodes from the user in order to further classify feature vectors that may not be otherwise classified by the classification labels stored in the existing signal data model.

Figure 5:
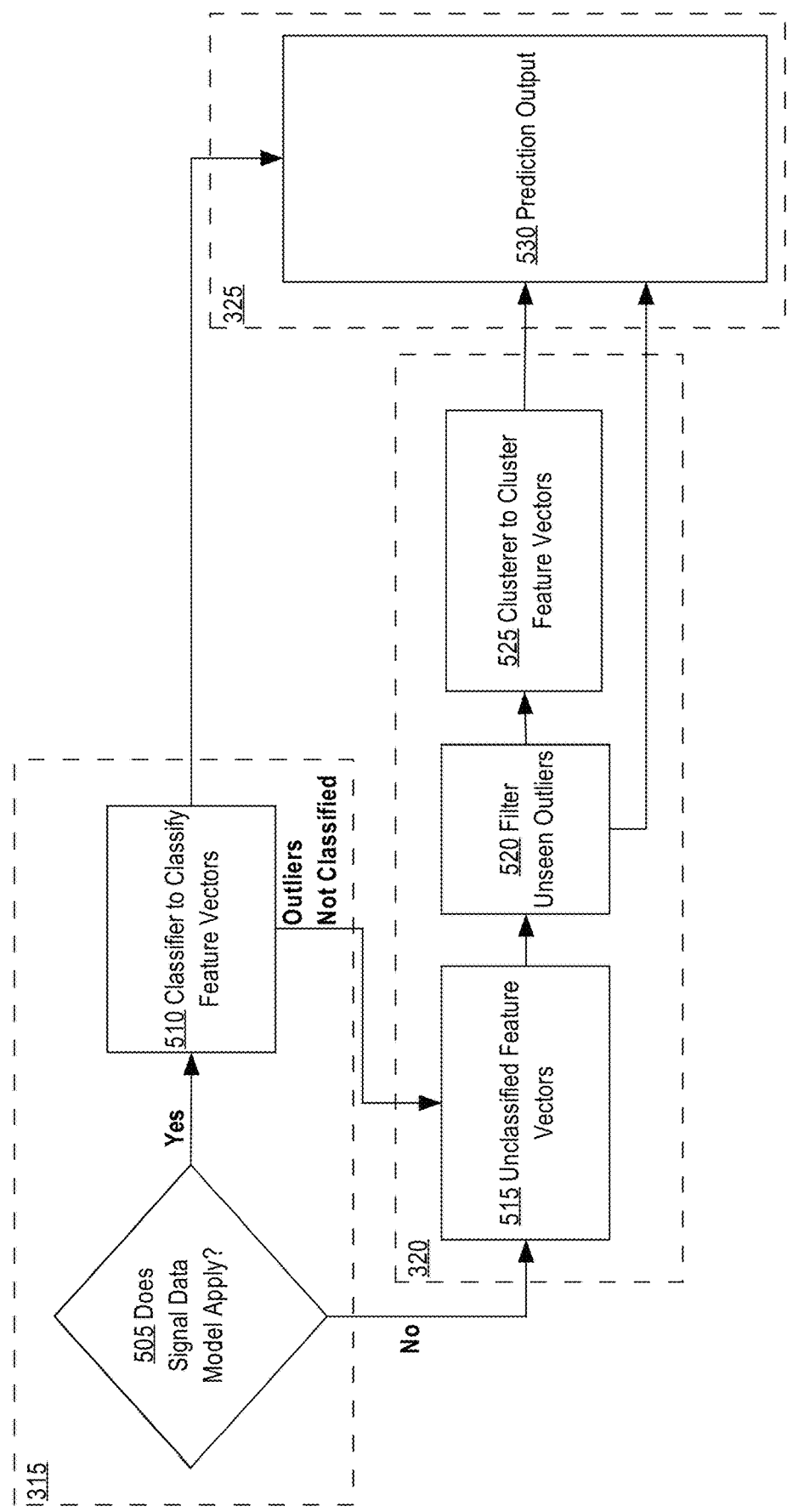
FIG. 5 depicts an example of assessing a data stream of signal data using an existing signal data model.

FIG. 5 depicts a more detailed example of assessing a data stream of signal data using an existing signal data model. In an embodiment, step 315 includes decision diamond 505 and block 510. At decision diamond 505, the signal data processing system determines whether an existing signal data model applies to the set of feature vectors. For example, if the signal data processing system 120 maintains three existing signal data models but none of the existing signal data models apply the type of signal data in the current feature vectors, then, at decision diamond 505, the signal data processing system 120 sends the feature vectors to block 515, which is programmed to collect unclassified feature vectors. If however at decision diamond 505, the signal data processing system 120 maintains an existing signal data model that may be used to classify the feature vectors, then the signal data processing system 120 proceeds to block 510 for associating classification labels to the feature vectors.

At block 510, the signal data processing system 120 uses the existing signal data model to associate and map classification labels to the feature vectors. In an embodiment, the signal data processing system 120 may receive sample episodes from the user for additional classification label information. In an embodiment, if there are remaining feature vectors that do not map to a classification label in the existing signal data model, then the remaining feature vectors represent outliers and may be sent to block 515. In an embodiment, the signal data processing system 120 sends the classified feature vectors and their associated classification labels to block 530, at which prediction output is collected to be reported to the user.

Referring back to FIG. 3, step 320 represents a step to generate clusters based upon feature vectors that were unable to be classified using the existing signal data model. Blocks 515, 520, and 525 of FIG. 5 represent an embodiment of the clustering steps within step 320. At block 515, unclassified feature vectors are received. In an embodiment, the set of unclassified feature vectors may originate from outliers from block 510 or feature vectors that did not match any of the existing signal data model maintained (decision diamond 505).

At block 520, the signal data processing system 120 filters out possible feature vector outliers that do not represent any meaningful data. Feature vectors that represent false conditions based upon known signatures signal values or frequencies that cause the false conditions may be filtered out as outliers that do not need to be clustered. In an embodiment, the filtered out feature vectors may be sent to block 530 for reporting to the user. By reporting any designated outliers to the user, the user may further configure the signal data model using future feedback or creating sample episodes to classify the outliers with a special outlier label.

At block 525, the signal data processing system 120 implements clustering instructions 122 to cluster the remaining feature vectors based on analyzing the set feature vectors and identifying mathematically significant regions in the vector feature space. The resulting number of clusters and their associated feature vectors are then sent to block 530 for reporting to the user.

3.2.2 Condition Reporting Instructions

Referring back to FIG. 3, at step 325 the data signal processing system 120 implements instructions, from the condition reporting instructions 126, to report conditions identified in the newly received signal data. In an embodiment, conditions reported may include, but are not limited to, feature vectors that have associated classification labels, clusters of feature vectors that have been identified but do not match any known classification labels, and feature vectors that may represent outliers that do not belong have an associated classification label and do not belong to an identified cluster. Block 530 of FIG. 5 represents prediction output that may be reported to a computer user, other computer, machine, or device. Prediction output may be configured as a graphical representation. In various embodiments, condition reporting and prediction output may be provided in reports printed by computer, graphical displays that the computer drives a computer display device to display, indicator displays, text messages, application alerts, and other messages or notifications.

In an embodiment, the condition reporting instructions 126 may provide instruction to report the prediction output as labeled conditions and unlabeled conditions within a graphical user interface. The labeled conditions may refer to feature vectors that map to classification labels and the unlabeled conditions may refer to clusters of feature vectors that did not map to classification labels. In an embodiment, the graphical interface may be represented as a time graph covering a range of time starting with the first received signal data and ending with the last received signal data.

Figure 6:
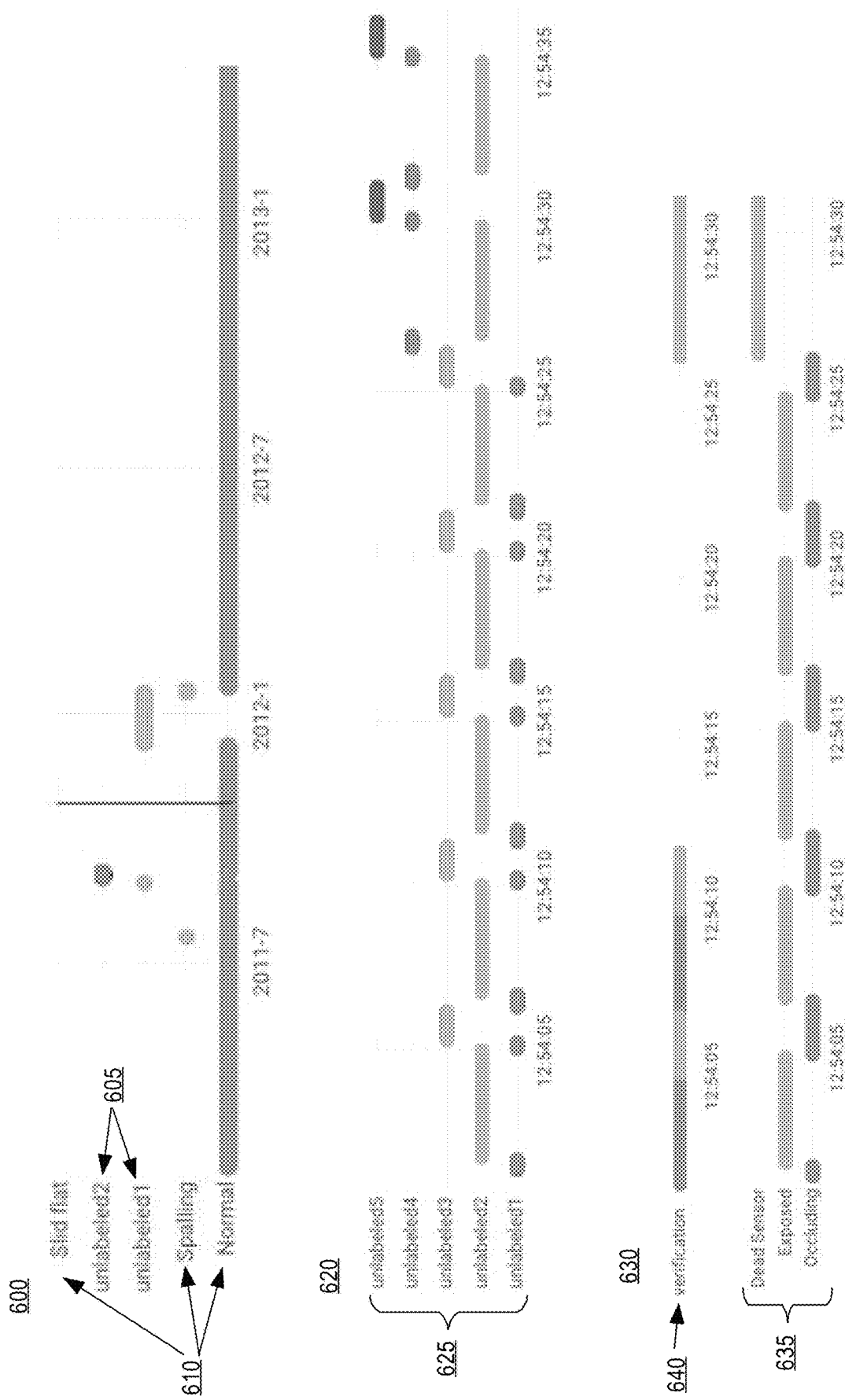
FIG. 6 depicts example time graphs of prediction out sent to a user for analysis and feedback.

FIG. 6 depicts example time graphs sent to the user for analysis and future feedback. In an embodiment, graph 600 may represent an existing signal data model that is able to classify feature vectors with classification labels 610, which classification labels include "Slid flat", "Spalling", and "Normal" classification labels. Unclassified labels 605 refer to "unlabeled1" and "unlabeled2", which may represent two different clusters that do not have classification labels that associate to them. In another embodiment, classification labels 610 may represent classification labels that were provided to the signal data processing system 120 as part of sample episodes.

Graph 620 depicts an example of a prediction output in which there were no classification labels that matched the feature vectors. In an embodiment, graph 620 may represent the scenario in which the signal data processing system 120 did not maintain any existing signal data model that matched the signal data within the current feature vectors. In this scenario, all of the feature vectors were sent to step 320, of FIG. 3, for cluster generation. In an embodiment, the newly generated clusters are then given arbitrary labels such as, unlabeled 1-5. In an embodiment, the user may then provide necessary feedback in the form of sample episodes or direct labeling of the clusters in order assign appropriate classification labels to the identified clusters.

Graph 630 depicts an example of prediction output that includes provided feedback by the user. Classification labels 635 depict three identified classification labels and the associated feature vectors occurring at a specific time. Feedback 640 depicts a verified condition, in this case called "verification" that was provided by the user as a sample episode. Graph 630 depicts an instance in which the user can verify that the provided verified conditions line up correctly with the classification labels assigned to the feature vectors.

3.2.3 Modifying Machines Based Upon Reported Conditions

Based upon the reported conditions that are generated and reported, responsive actions may be taken on or using one or more of the machines that are monitored. In an embodiment, reported conditions generated by the condition reporting instructions 126 may include condition definition instructions that are sent to the external system 110 for the purposes of defining and/or augmenting conditional state definitions within the external system 110. Conditional state definitions include defined types of conditions for the external system 110, or parts of the external system 110. These conditional states are then used to assess the operating condition of the external system 110. Condition definition instructions may then be used to modify the existing conditional states in order to improve the safety, reliability, efficiency, and quality of production.

For example, if the external system 110 represents an industrial machine then the reported conditions include definition instructions that may be used to redefine certain the existing conditions within the external system 110, including, redefining when conditions such as, slid flat, spalling, normal, critical, and error are identified.

In the case where the external system 110 represents a wireless activity tracker, then the reported conditions may be used by the external system 110 to modify when the external system recognizes certain activity from its user. For example, if the reported conditions identify classifications of feature vectors that show a specific running movement, where that specific movement was not previously identified as running, then the external system 110 may update its recognition of running conditions using the newly reported conditions.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
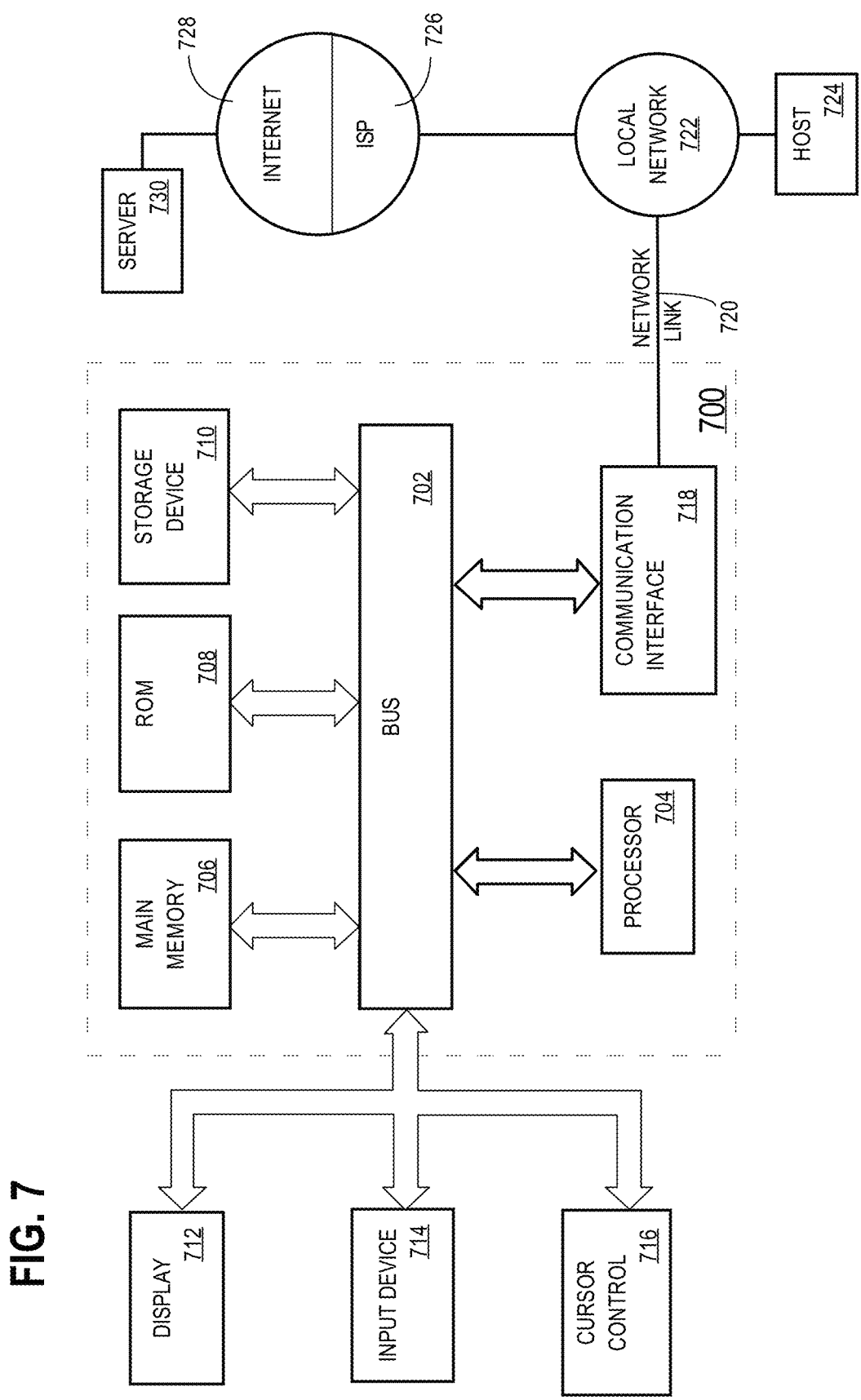
FIG. 7 illustrates an example computer system that may be configured to implement, individually or in cooperation with other computer systems, various technical steps described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using signal receiving instructions in a server computer system, receiving one or more sets of signal data that represent observed data values from one or more sensors that are attached to industrial equipment;
   using feature identification instructions, aggregating the one or more sets of signal data into one or more feature vectors, wherein the one or more feature vectors represent a set of the signal data over a particular range of time;
   using clustering instructions, determining one or more clusters for the one or more feature vectors, wherein the one or more clusters comprise a subset of feature vectors from the one or more feature vectors based upon attributes within the subset of feature vectors;
   using vector classification instructions, receiving one or more sample episodes that include sample feature vectors that have each been assigned one of a plurality of distinct classification labels by an external source that represent identified conditions occurring on the industrial equipment, at least one of the sample feature vectors being not in the one or more clusters;
   determining that the number of the plurality of distinct classification labels exceeds a certain threshold;
   using the vector classification instructions, determining one of the plurality of classification labels for each of the one or more clusters based upon the one or more sample episodes;
   using the vector classification instructions, generating and storing a signal data model that defines identified signal conditions that represent conditions occurring on the industrial equipment, wherein the identified signal conditions define a mapping between a specific feature vector, a specific cluster to which the specific vector belongs, and one of the plurality of distinct classification labels determined for the specific cluster.

2. The method of claim 1, further comprising processing the one or more sets of signals to remove signature signal values that have been identified as signal values that obfuscate pattern recognition within the one or more sets of signal data.

3. The method of claim 1, wherein aggregating the one or more sets of signal data into one or more feature vectors comprises:
   determining a time window size for the one or more feature vectors, wherein the time window size provides a time range of statistical interest for the one or more sets of signal data;
   generating the one or more feature vectors from one or more sets of signal data that correspond to the time window size;
   reducing dimensionality of each of the one or more feature vectors by consolidating subsets of feature vectors of the one or more feature vectors into single feature vectors that correspond to a specific time window.

4. The method of claim 1, wherein aggregating the one or more sets of signal data into one or more feature vectors comprises transforming the one or more sets of signal data into a single sequence of the one or more feature vectors, wherein the single sequence of the one or more feature vectors represent a time sequence pattern of the one or more sets of signal data.

5. The method of claim 1, determining the classification label for the one or more clusters further comprises designating an unclassified classification label to a particular cluster of the one or more clusters if the classification label cannot be determined based upon classification labels from the one or more sample episodes.

6. The method of claim 1, wherein determining the classification label for the one or more clusters based upon the one or more sample episodes uses logistic regression analysis of the one or more sample episodes and the one or more clusters.

7. The method of claim 1, wherein determining the classification label for the one or more clusters based upon the one or more sample episodes, is based upon random forest analysis of the one or more sample episodes and the one or more clusters.

8. A method comprising:
   using signal data model maintenance instructions in a server computer system, maintaining a signal data model that maps conditions occurring on industrial equipment based upon received signal data from the industrial equipment, wherein the signal data model comprises mapping data between an existing feature vector, an existing cluster to which the existing feature vector belongs, and one of a plurality of distinct classification labels determined for the existing cluster, the plurality of distinct classification labels being assigned by an external source to additional sample feature vectors;

wherein the number of the plurality of distinct classification labels exceeds a certain thresholds;

wherein the existing feature vectors are aggregations of the received signal data that represent observed data values from one or more sensors attached to the industrial equipment;

wherein the existing clusters each comprise a set of existing feature vectors based upon at least one defined attribute of the existing feature vectors and are each assigned one of the plurality of classification labels based on the additional sample vectors;

wherein the classification labels define specific conditions occurring on the industrial equipment at a particular moment in time;

using signal receiving instructions, receiving one or more sets of new signal data from the one or more sensors attached to the industrial equipment;

using feature identification instructions, aggregating the one or more sets of new signal data into one or more feature vectors, wherein the one or more feature vectors represent a set of signal data over a particular range of time;

using vector classification instructions, assigning one or more classification labels and one or more existing clusters, from the signal data model, to the one or more feature vectors;

using condition reporting instructions, sending the one or more feature vectors and the one or more classification labels assigned to the one or more feature vectors to a user.

9. The method of claim 8, further comprising using the signal data model maintenance instructions, updating the signal data model with mapping data that maps the one or more feature vectors to the existing clusters and classification labels assigned to the one or more feature vectors.

10. The method of claim 8, further comprising using clustering instructions, assigning an unclassified classification label to a subset of the one or more feature vectors if the one or more classification labels are unable to be assigned to the subset of the one or more feature vectors.

11. The method of claim 10, wherein assigning the unclassified classification label to the subset of the one or more feature vectors further comprises:

using clustering instructions, determining one or more clusters for a subset of one or more feature vectors, wherein the one or more clusters comprise two or more feature vectors from the subset of one or more feature vectors based upon attributes within the two or more feature vectors;

using the clustering instructions, assigning a unique identifier to each of the one or more clusters that represents a unique unclassified classification label for the unclassified classification label.

12. The method of claim 8, wherein assigning the one or more classification labels and the one or more existing clusters further comprises:

using the vector classification instructions, receiving one or more sample episodes, wherein the one or more sample episodes include sample feature vectors that have been assigned classification labels;

using the vector classification instructions, assigning one or more classification labels, from the one or more sample episodes, to the one or more feature vectors.

13. A data processing system comprising:

a memory;

one or more processors coupled to the memory;

signal receiving instructions stored in memory, executed by one or more processors, and configured to cause the one or more processors to receive one or more sets of signal data that represent observed data values from one or more sensors attached to industrial equipment;

feature identification instructions stored in memory, executed by one or more processors, and configured to cause the one or more processors to aggregate the one or more sets of signal data into one or more feature vectors that represent a set of signal data over a particular range of time;

clustering instructions stored in memory, executed by one or more processors, and configured to cause the one or more processors to determine one or more clusters for the one or more feature vectors, wherein the one or more clusters comprise a subset of feature vectors from the one or more feature vectors based upon attributes within the subset of feature vectors;

vector classification instructions stored in memory, executed by one or more processors, and configured to cause the one or more processors to receive one or more sample episodes that include sample feature vectors that have each been assigned one of a plurality of classification labels by an external source that represent identified conditions occurring on the industrial equipment, at least one of the sample feature vector being not in the one or more clusters;

determining that the number of the plurality of distinct classification labels exceeds a certain threshold;

the vector classification instructions stored in memory, executed by one or more processors, and configured to cause the one or more processors to determine one of the plurality of classification labels for each of the one or more clusters based upon the one or more sample episodes;

the vector classification instructions stored in memory, executed by one or more processors, and configured to cause the one or more processors to generate and store a signal data model that defines identified signal conditions that represent conditions occurring on the industrial equipment, wherein the identified signal conditions define a mapping between a specific feature vector, a specific cluster to which the specific feature vector belongs, and one of the plurality of distinct classification labels determined for the specific cluster.

14. The data processing system of claim 13, further comprising instructions stored in memory, executed by the one or more processors, and configured to cause the one or more processors to receive the one or more sets of signal data and process the one or more sets of signals to remove signature signal values that have been identified as signal values that obfuscate pattern recognition within the one or more sets of signal data.

15. The data processing system of claim 13, further comprising instructions stored in memory, executed by the one or more processors, and configured to cause the one or more processors to aggregate the one or more sets of signal data into one or more feature vectors by:
- determining a time window size for the one or more feature vectors, wherein the time window size provides a time range of statistical interest for the one or more sets of signal data;
- generating the one or more feature vectors from one or more sets of signal data that correspond to the time window size;
- reducing dimensionality of each of the one or more feature vectors by consolidating subsets of feature vectors of the one or more feature vectors into single feature vectors that correspond to a specific time window.

16. The data processing system of claim 13, further comprising instructions stored in memory, executed by the one or more processors, and configured to cause the one or more processors to aggregate the one or more sets of signal data into one or more feature vectors by transforming the one or more sets of signal data into a single sequence of the one or more feature vectors, wherein the single sequence of the one or more feature vectors represent a time sequence pattern of the one or more sets of signal data.

17. The data processing system of claim 13, further comprising instructions stored in memory, executed by the one or more processors, and configured to cause the one or more processors to determine the classification label for the one or more clusters and to designate an unclassified classification label to a particular cluster of the one or more clusters if the classification label cannot be determined based upon classification labels from the one or more sample episodes.

18. The data processing system of claim 13, further comprising instructions stored in memory, executed by the one or more processors, and configured to cause the one or more processors to determine the classification label for the one or more clusters based upon the one or more sample episodes, is based upon logistic regression analysis of the one or more sample episodes and the one or more clusters.

19. The data processing system of claim 13, further comprising instructions stored in memory, executed by the one or more processors, and configured to cause the one or more processors to determine the classification label for the one or more clusters based upon the one or more sample episodes, is based upon random forest analysis of the one or more sample episodes and the one or more clusters.

20. A data processing system comprising:
a memory;
one or more processors coupled to the memory;
signal data model maintenance instructions stored in memory, executed by one or more processors, and configured to cause the one or more processors to maintain a signal data model that maps conditions occurring on industrial equipment based upon received signal data from the industrial equipment, wherein the signal data model comprises mapping data between an existing feature vector, an existing cluster to which the existing feature vector belongs, and one of a plurality of distinct classification labels determined for the existing cluster, the plurality of distinct classification labels being assigned by an external source to additional sample feature vectors;
wherein the number of the plurality of distinct classification labels exceeds a certain thresholds;
wherein the existing feature vectors are aggregations of the received signal data that represent observed data values from one or more sensors attached to the industrial equipment;
wherein the existing clusters each comprise a set of existing feature vectors based upon at least one defined attribute of the existing feature vectors and are each assigned one of the plurality of classification labels based on the additional sample vectors;
wherein the classification labels define specific conditions occurring on the industrial equipment at a particular moment in time;
signal receiving instructions stored in memory, executed by one or more processors, and configured to cause the one or more processors to receive one or more sets of new signal data from the one or more sensors attached to the industrial equipment;
feature identification instructions stored in memory, executed by one or more processors, and configured to cause the one or more processors to aggregate the one or more sets of new signal data into one or more feature vectors, wherein the one or more feature vectors represent a set of signal data over a particular range of time;
vector classification instructions stored in memory, executed by one or more processors, and configured to cause the one or more processors to assign one or more classification labels and one or more existing clusters, from the signal data model, to the one or more feature vectors;
condition reporting instructions stored in memory, executed by one or more processors, and configured to cause the one or more processors to send the one or more feature vectors and the one or more classification labels assigned to the one or more feature vectors to a user.

21. The data processing system of claim 20, further comprising instructions stored in memory, executed by the one or more processors, and configured to cause the one or more processors to update the signal data model with mapping data that maps the one or more feature vectors to the existing clusters and classification labels assigned to the one or more feature vectors.

22. The data processing system of claim 20, further comprising instructions stored in memory, executed by the one or more processors, and configured to cause the one or more processors to assign an unclassified classification label to a subset of the one or more feature vectors if the one or more classification labels are unable to be assigned to the subset of the one or more feature vectors.

23. The data processing system of claim 22, further comprising instructions stored in memory, executed by the one or more processors, and configured to cause the one or more processors to assign the unclassified classification label to the subset of the one or more feature vectors by:
- determining one or more clusters for a subset of one or more feature vectors, wherein the one or more clusters comprise two or more feature vectors from the subset of one or more feature vectors based upon attributes within the two or more feature vectors;
- assigning a unique identifier to each of the one or more clusters that represents a unique unclassified classification label for the unclassified classification label.

24. The data processing system of claim 20, further comprising instructions stored in memory, executed by the one or more processors, and configured to cause the one or more processors to assign the one or more classification labels and the one or more existing clusters by:
    receiving one or more sample episodes that include sample feature vectors that have been assigned classification labels;
    assigning one or more classification labels, from the one or more sample episodes, to the one or more feature vectors.

* * * * *